June 13, 1961 W. W. LIGHT 2,987,947
AUTOMATIC TUBE CUTTING MACHINE
Filed Nov. 12, 1958 6 Sheets-Sheet 3

INVENTOR.
WALLACE W. LIGHT
BY
ATTORNEY

June 13, 1961  W. W. LIGHT  2,987,947
AUTOMATIC TUBE CUTTING MACHINE
Filed Nov. 12, 1958  6 Sheets-Sheet 4

*INVENTOR.*
WALLACE W. LIGHT
BY
ATTORNEY

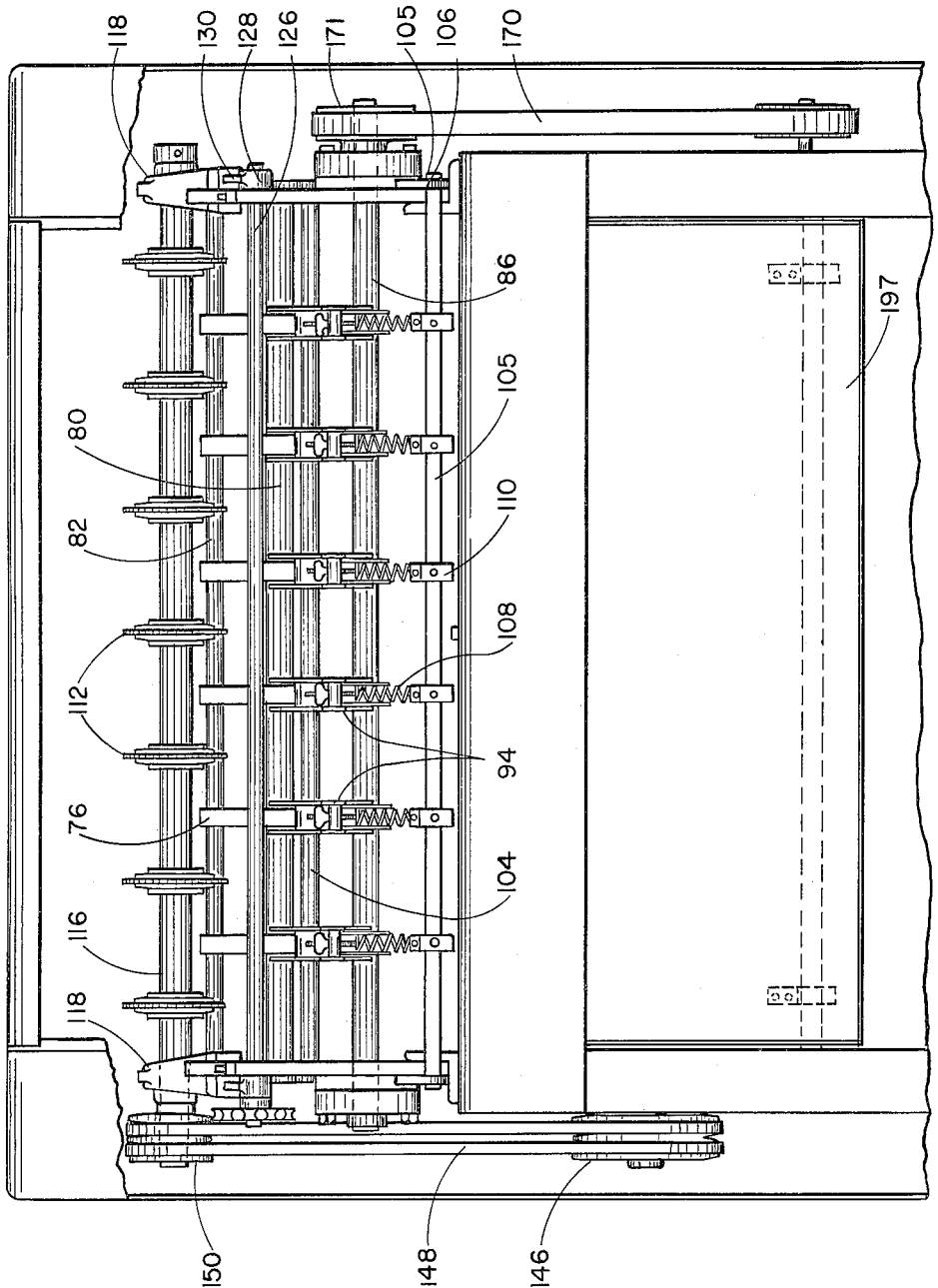

June 13, 1961 W. W. LIGHT 2,987,947
AUTOMATIC TUBE CUTTING MACHINE
Filed Nov. 12, 1958 6 Sheets-Sheet 6

INVENTOR.
WALLACE W. LIGHT

United States Patent Office 2,987,947
Patented June 13, 1961

2,987,947
AUTOMATIC TUBE CUTTING MACHINE
Wallace W. Light, Rochester, N.Y., assignor to M. D. Knowlton Company, Rochester, N.Y., a corporation of New York
Filed Nov. 12, 1958, Ser. No. 773,285
9 Claims. (Cl. 82—46)

This invention relates to automatic tube cutting machines, and more particularly to machines for cutting tubes composed of paper, paper board, and other fibrous material, one object being the provision of a more satisfactory machine of this nature.

Paper and paper board tubing is generally supplied in standard lengths up to three feet. It is often desired to cut this tubing into shorter lengths for use as mailing tubes, the side walls of cylindrical paper cartons, cores for electrical coils, and for many other uses. Heretofore, the standard method for cutting the tubes into shorter lengths was to place them on a mandrel, and to rotate the tubing in contact with a knife or other cutting edge which was pressed against the mandrel. This method is slow, cumbersome and costly, and requires a different mandrel for each size tube. For this reason, another object of this invention is to provide a method for cutting paper tubing of predetermined lengths without the necessity of placing the tube upon a mandrel.

In order to produce tubing in short lengths having evenly cut ends, it is necessary to rotate the tubing while it is being cut. For this reason, another object of this invention is to provide a tube cutting machine having provisions for rotating the tubing while it is in contact with the cutting members.

Another object of this invention is the provision of a tube cutting machine which is completely automatic in operation.

In manufacturing plants and other places producing short sections of tubing, it is often necessary to cut tubing into various lengths. For this reason, the provision of an automatic tubing cutter of the above description having adjustable cutting means for producing tubing cut in any desired length, is another object of this invention.

A further object of this invention is the provision of a tubing cutter capable of automatically receiving and cutting tubing of varying diameter and wall thicknesses.

A further object of this invention includes the provision of a tubing cutter of the above description which is completely automatic in operation, and which will receive tubing from a conveyor or other automatic feeding means and continuously cut the same in predetermined lengths, and deliver the same without attention from the operator.

Still further objects of this invention include the provision of a tube cutting machine of the above description that is relatively inexpensive to produce, simple and reliable in operation, and which requires a minimum of maintenance or attention from the operator.

Other objects and advantages of my invention will be particularly set forth in the claims and will be apparent from the following description, when taken in connection with the accompanying drawings, in which:

FIG. 5 is a rear elevational view, partially cut away;

Figure 1:
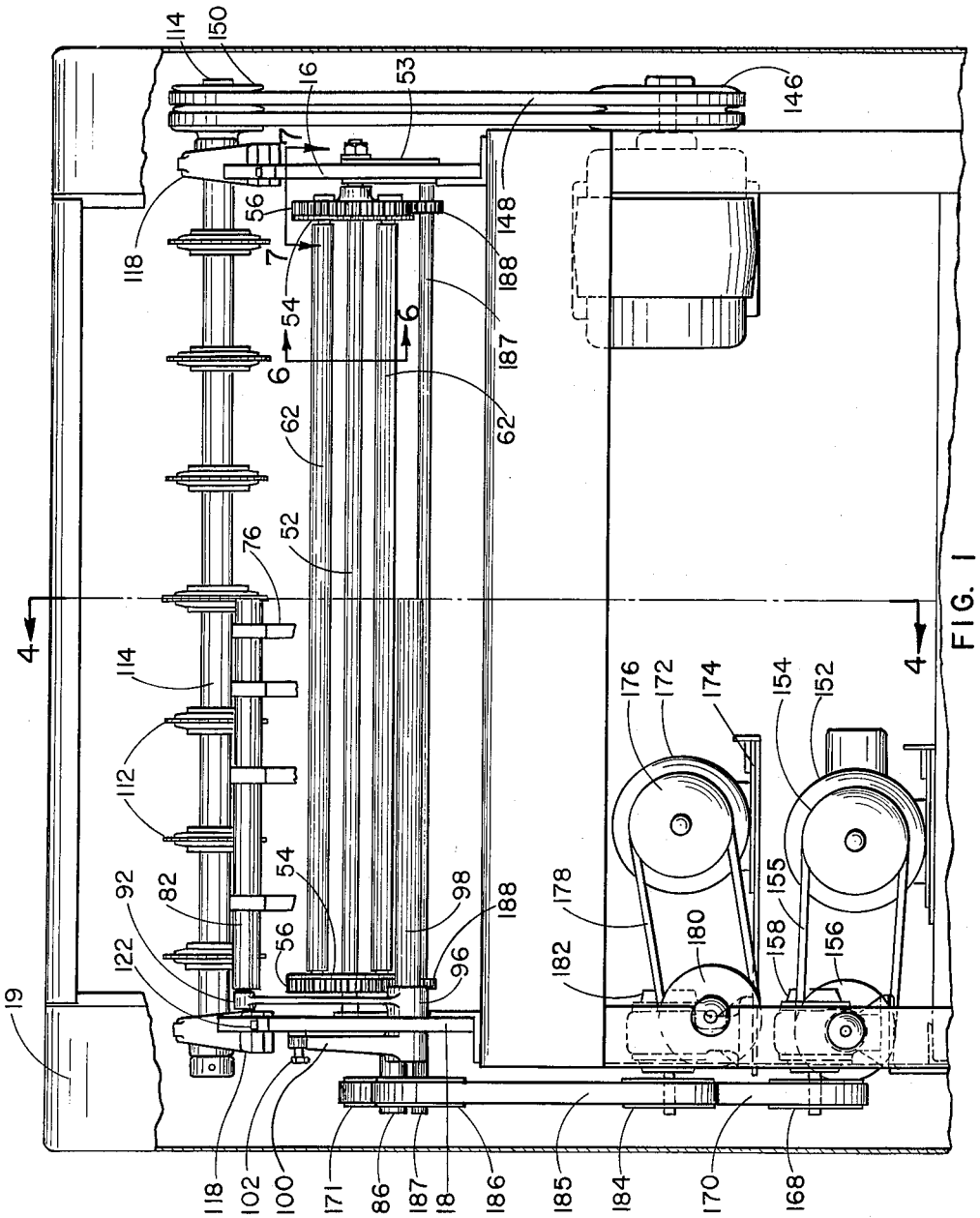
FIG. 1 is a front elevational view, partially cut away, of a tube cutting machine embodying the present invention.

A tubing cutter embodying the present invention, herewith described for purposes of illustration, preferably comprises a supporting frame, a plurality of transversely disposed saws or other cutting elements, the tube carrier for moving tubes, one at a time, in an upward circular path into contact with the saws, moving belt means which contact the tubes as they approach the saws for causing the tubes to rotate while they are being cut, chute means for delivering uncut tubes to the tubing carrier, discharge chute means for removing the cut tubes, and electrical motor and associated drive means for driving the working parts described above.

Referring now to the drawings, the tubing cutter is preferably supported by a frame comprising four vertically extending legs 10 (FIG. 2) connected at the top by horizontally extending members 12 and braced near the bottom by cross members 14. The upper part of the frame carries a pair of spaced, parallel vertically extending plates 16 and 18 (FIG. 1) which support the working parts of the machine.

The working parts of the machine are preferably covered and protected by a sheet metal cover 19. Cover 19 is preferably provided with a hinged top portion 21 (FIG. 4) and removable side panels (not shown) to provide access to the working parts for adjustment and repair.

The tubes to be cut are fed to the machine by means of a sheet metal chute 20 (FIG. 4) mounted between plates 16 and 18. Chute 20 comprises a sheet metal bottom piece 22 and preferably includes a pair of upwardly extending side flanges (not shown) for transversely positioning the tubes as they roll into the machine.

Chute 20 is supported by downwardly extending lugs 24 and 26 (FIG. 4) located adjacent to the front and rear ends of bottom 22, respectively. Lugs 24 are transversely bored to receive a horizontally extending rod 28 which extends outwardly through a pair of inclined slots 30 in plates 16 and 18. Slots 30 serve to control the direction of movement of rod 28, as hereinafter explained.

Rod 28 is pivotally connected at each end to one of a pair of links 32 each of which is pivotally connected to the upper end of an L-shaped bracket 34. Brackets 34 are pivotally mounted on a transverse shaft 36 which is suitably journaled in plates 16 and 18. Front lugs 26 of chute 20 are pivotally connected to downwardly depending links 38 which are in turn pivotally connected to L-shaped brackets 40. Brackets 40 are pivotally mounted on plates 16 and 18 by means of transversely extending shaft 42. A connecting link 44 connects lower ends of L-shaped brackets 34 and 40.

The position and angular inclination of chute 20 may be controlled by manipulating a handle (not shown) rigidly attached to one end of shaft 36. When this handle is turned in a counterclockwise direction as viewed in FIG. 4, it imparts a similar movement to bracket 34. This movement of bracket 34 causes an upward movement of link 32, which moves transverse shaft 24 upwardly. The motion of transverse shaft 24 is guided by the inclination of slots 30 in plates 16 and 18 so the shaft moves upwardly at an angle corresponding to the inclination of slot 30. This upward movement moves the front end of chute 20 upwardly and forwardly in order to move the front end of chute 20 closer to the tube carrier. At the same time, the counterclockwise rotation of brackets 34 is communicated to L-shaped brackets 40 through connecting links 44. Thus, when brackets 34 are moved in a counterclockwise direction, the upper end of bracket 40 is moved in an upward direction. This motion is communicated to the rear end of chute 20 by means of links 38, causing the rear end of chute 20 to move in an upward direction. Thus, rotation of shaft 36 in a counterclockwise direction causes the entire chute to move upwardly and forwardly at an angle controlled by slots 30 in order to cause chute 20 to approach the tube carrier mechanism at a substantially constant inclination. The range of movement of shaft 36 is limited by means of a transversely extending plate 48 (FIG. 3) keyed to one end of shaft 36 and having an arcuate slot 49. Slot 49 engages a stud 50 rigidly mounted on plate 16 and the ends of the slot engage stud 50 to limit the rotational movement of shaft 36.

Figure 7:
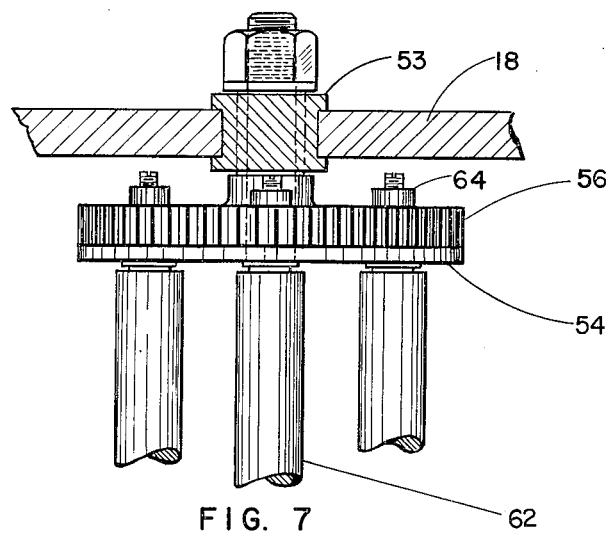
FIG. 7 is an enlarged fragmentary cross-sectional view taken substantially along lines 7—7 of FIG. 1.
Figure 6:
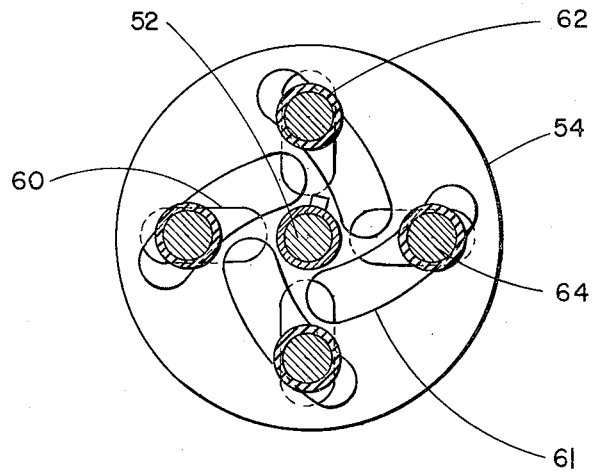
FIG. 6 is an enlarged fragmentary cross-sectional view taken substantially along lines 6—6 of FIG. 1.

The tube carrier comprises a pair of spaced, parallel roller supports mounted on a transversely extending shaft 52 journaled in a pair of brackets 53 which are slidably mounted in vertically extending slots in plates 16 and 18. Each of the roller supports comprises a disc 54 and a gear 56 (FIG. 7), whose faces are in contact. Disc 54 is provided with four spirally oriented slots 61 (FIG. 6) which extend from points adjacent to the center of the disc to points near the periphery. Gear 56 is provided with four straight radial slots 60. Slots 61 and 60 are in registry at the points where they cross as shown in FIG. 6. Four spaced parallel transversely extending rollers 62 are rotatably mounted on shafts 64 which extend outwardly through slots 60 and 61 at their points of registry.

Disc 54 and gear 56 are relatively rotatable. When disc 54 is rotated in a clockwise direction with respect to gear 56, the arcuate inner edges of slots 61 cam shafts 64 outwardly in slots 60; relative counterclockwise rotation of disc 54 moves shafts 64 inwardly. This provides for radial adjustment of the position of rollers 62 with respect to the center of disc 54 and gear 56 for purposes hereinafter to be explained. Disc 54 and gear 56 may be locked against relative rotation by bolts (not shown) in order to lock rollers 62 in adjusted position.

Figure 3:
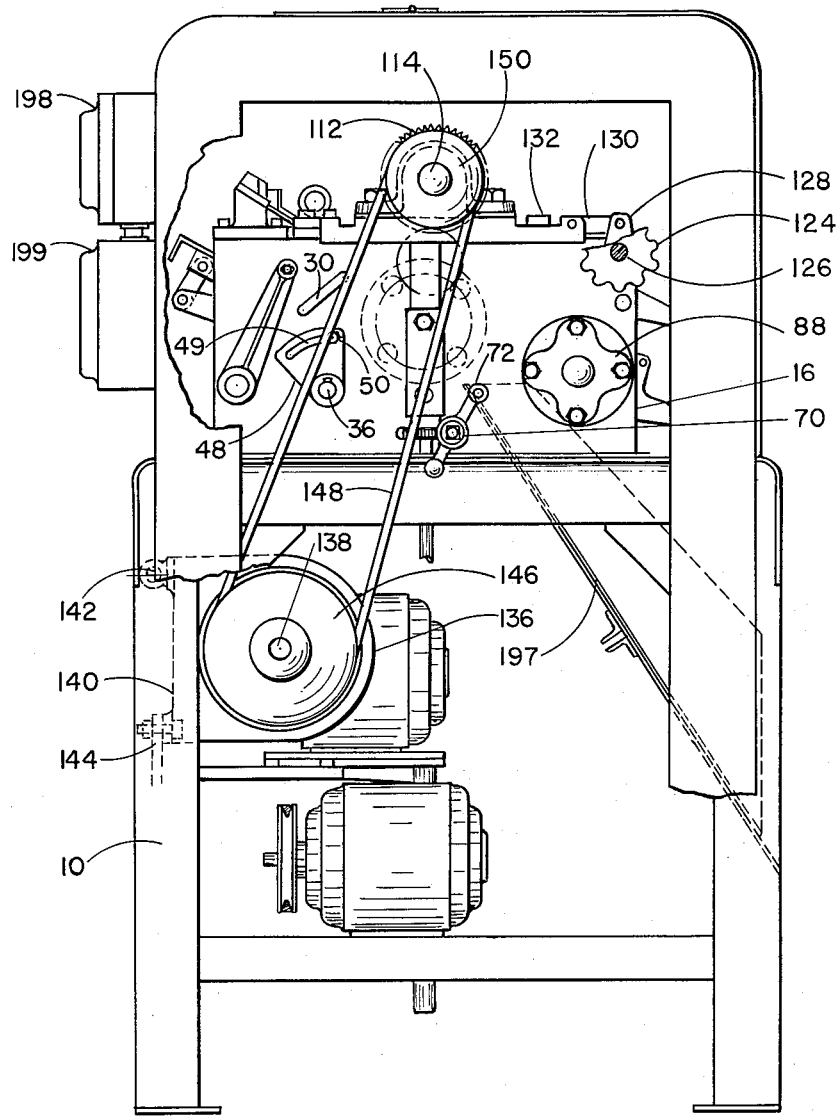
FIG. 3 is a side elevational view of the tubing cutter of the present invention taken from the side opposite to that of FIG. 2.

Brackets 53 are threadedly mounted on upper ends of vertically extending shafts 64 (FIG. 4), which are journaled in cross members 12. Shafts 64, carry worm wheels 66 which engage a pair of worms 68 rigidly mounted on a transversely extending shaft 70 journaled in plates 16 and 18. Shaft 70 is provided with a crank 72 (FIG. 3). The vertical position of the tube carrier may be adjusted by turning crank 72, which turns worms 68 causing shafts 64 to rotate in unison, moving brackets 53 upwardly or downwardly in order to change the vertical position of both ends of the tube carrier simultaneously. This adjustment of the tube carrier also causes corresponding vertical movement of the motor for driving the carrier, as will hereinafter be explained.

Figure 4:
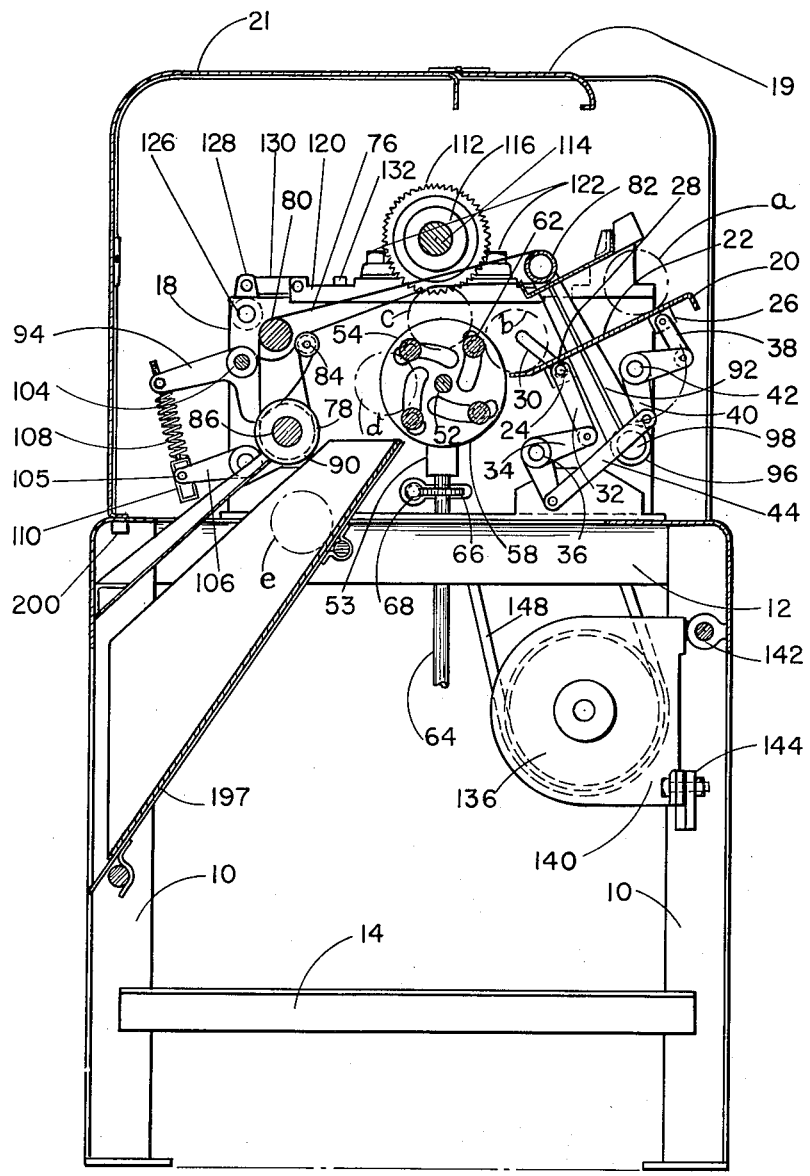
FIG. 4 is a cross-sectional view taken substantially along lines 4—4 of FIG. 1.

The tubes supported by the tubing carrier are rotated by a plurality of belts 76 which contact the upper surface thereof. Belts 76 are carried by transversely extending rollers 78, 80, 82, and 84 (FIG. 4). Roller 78 is mounted on a shaft 86 journaled in bearings 88 (FIG. 3) mounted on plates 16 and 18, and is provided with a plurality of spaced grooves 90 (FIG. 4) for maintaining belts 76 in line. Roller 80 is journaled in plates 16 and 18; roller 82 is journaled on the end of a pair of arms 92, which will hereinafter be described; and roller 84 is journaled in the end of a second pair of arms 94.

Figure 2:
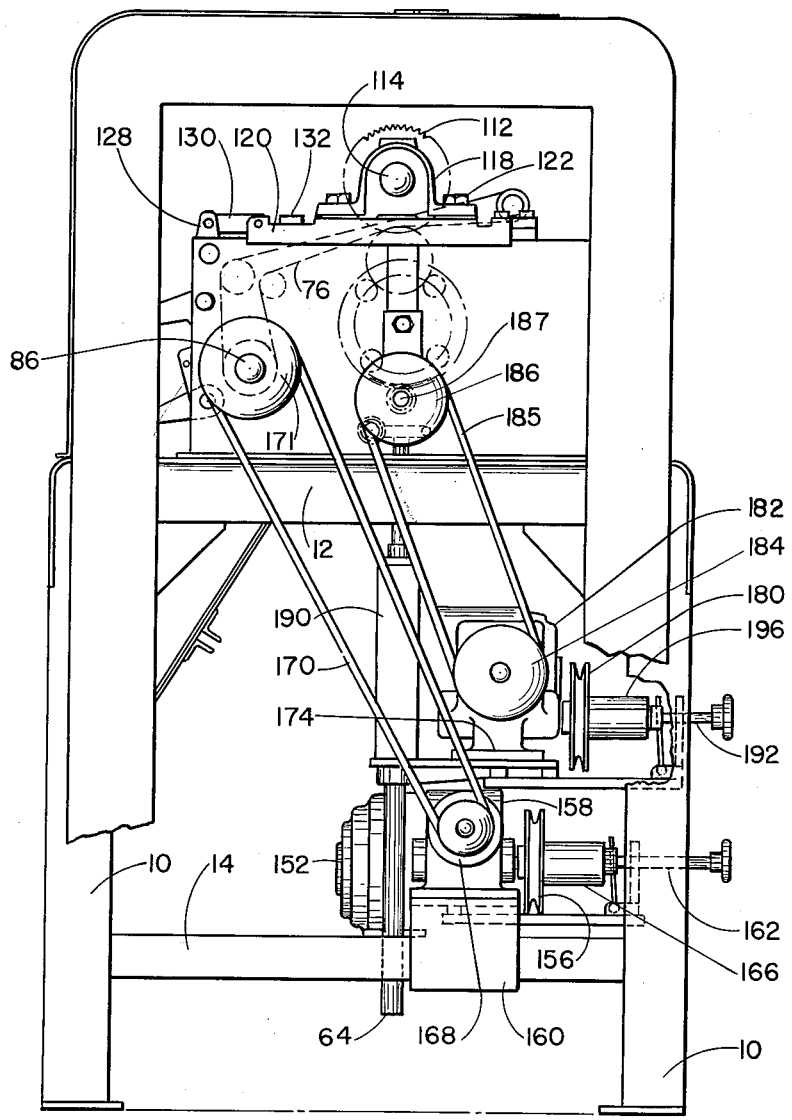
FIG. 2 is a side elevational view of the tubing cutter of FIG. 1.

Arms 92 form an integral part of hollow cylindrical brackets 96 (FIG. 1) which are journaled in plates 16 and 18, as shown in FIG. 1. Brackets 96 are connected by a transverse shaft 98. Each bracket 96 carries a pair of outwardly extending integral arms 100 on the outside of plates 16 and 18. Tension is applied to belts 76 by adjusting the position of roller 82 which is accomplished by moving arms 100 to the desired position. Arms 100 are then clamped in adjusted position by means of a pair of bolts 102 which engage plates 16 and 18 in order to clamp bracket 96 and arms 92 in adjusted position.

Arms 94 are pivotally mounted in plates 16 and 18 by means of a transversely extending shaft 104 (FIGS. 4 and 5). The outer ends of arms 94 are connected to a transversely extending rod 105 supported at each end by a pair of stationary arms 106 by means of tension coil springs 108. Springs 108 are connected to rod 105 by means of plates 110. Arms 94 are free to pivot on shafts 104 thereby applying resilient yielding tension to belts 76 so that they may yield when they are contacted by a tube as described below.

The tube cutting means comprises a plurality of saws 112 mounted on a transversely extending shaft 114. Saws 112 are held in transverse spaced relationship by means of a plurality of set screws (not shown). Any number of saws 112 may be provided, and the spacing between adjacent saws may be varied to correspond to the desired number of cuts.

Saw shaft 114 is rotatably mounted in a pair of bearings 118 which are bolted to slides 120 by bolts 122. Slide 118 is slidably mounted on the upper edges of plates 16 and 18. This method of fastening saw shaft 114 allows removal and replacement of the saw shaft for sharpening of the saws, or changing the number thereof without disturbing any other portion of the machine.

The position of slide 120 on plates 16 and 18 is controlled by means of a handwheel 124 (FIG. 3) mounted on a transversely extending shaft 126 which is journaled in plates 16 and 18. Each end of shaft 126 carries short upwardly extending arm 128 (FIGS. 3 and 4) which is pivotally attached to a slide 120 by means of a short link 130. Rotation of hand wheel 124 causes movement of arm 128 which is transferred to slide 120 by means of links 130 to adjust the longitudinal position of saws 112 with respect to the carrier. Slides 120 may be clamped in an adjusted position on plates 16 and 18 by means of bolts 132.

The driving means for saws 112 comprises an electric motor 136 (FIG. 3) having a shaft 138. Motor 136 is mounted on a bracket 140 which is pivotally attached to vertical member 10, as shown at 142 in FIG. 4. A stop 144 is provided to limit the downward movement of the motor.

Motor shaft 138 is provided with a sheave 146 for driving a pair of V-belts 148 (FIGS. 1 and 3) which drive a second sheave 150 which is mounted on one end of saw shaft 114. The weight of motor 136 and bracket 140 is partially supported by belts 148, and serve to hold these belts in the proper tension. The pivotal movement of the motor takes up any slack that may result from the adjustment of the saws longitudinally along the tops of plates 16 and 18.

Belts 76 are driven by means of an electric motor 152 (FIG. 1) provided with a sheave 154. Sheave 154 drives a variable diameter pulley 156 on a right angle speed reducer 158 which is mounted on a frame 160 (FIG. 2) on a horizontal member 14. The diameter of pulley 156 may be varied by means of a screw 162 threadedly mounted in a bushing 166 on one side of the pulley. Speed reducer 158 is provided with a pulley 168 for driving a belt 170. Belt 170 drives a pulley 171 on shaft 86, which, in turn, drives belts 76. The speed of belts 76 may be regulated, within limits, by varying the effective diameter of variable diameter pulley 156 by means of screw 162.

The tube carrier is driven by means of a third electric motor 172 (FIG. 1) mounted on a frame 174. Motor 172 is provided with a sheave 176 (FIG. 1) for driving a V-belt 178 which runs over a variable diameter pulley 180 on a right angle speed reducer 182. Speed reducer 182 carries a pulley 184 for driving a flat belt 185 which runs over a pulley 186 mounted on one end of a shaft 187 of the tube carrier. Shaft 187 carries a pair of pinions 188 (FIG. 1) which mesh with gears 56 of the tube carrier. Frame 174 is supported by a vertically extending threaded cylindrical bushing 190 (FIG. 2) which is mounted on threaded shaft 64 described above. Thus, motor 176 and speed reducer 182 move upwardly and downwardly with the tube carrier when the same is adjusted in a vertical direction by a manipulation of handle 72, as described above. The speed of rotation of the tube carrier may be varied by adjusting the effective diameter of pulley 180 by means of a screw 192 threadedly mounted in a bushing 196 attached to speed reducer 182.

The electrical connections supplying current for electric motors 136, 152, and 172 are preferably made through a pair of switch boxes 198 and 199 (FIG. 3) containing standard, commercially available push button switches. One of the switches preferably controls motors 152 and 172 which operate the tube carrier and belts, while the other preferably controls motor 136 which drives the saws. This arrangement permits the tube carrier and belt mechanisms to be operated separately to facilitate the observation and adjustment of these parts while the saws are stationary. This is an important safety measure, since it would be extremely dangerous to attempt adjustment in the neighborhood of the running saws.

The incorporation of a pressure switch 200 (FIG. 4) under the lip of hinged top 21 is also desirable as a further safety feature. Switch 200 is adapted to open the circuit to motor 136 when the cover 21 is lifted, positively preventing the saws from being turned on when the working parts of the machine are exposed.

In operation, the paper tubes to be cut are placed in chute 20 with their axes extending transverse to the machine as shown at "a" in dotted lines in FIG. 4. In practice, chute 20 may be completely filled with abutting tubes. The tubes roll down chute 20 until the outer periphery of the first tube contacts one of the rollers 62 in the tube carrier mechanism as shown at "b." This prevents further forward movement of the tube and holds the same in chute 20.

As the tube carrier rotates in a counterclockwise direction as viewed in FIG. 4, the roller 62 which is holding the tube in place at the bottom end of chute 20 moves out of the way, allowing the tube to roll forwardly and downwardly. As this occurs, the next roller 62 which is moving upwardly in a curved path contacts the bottom of the tube which has just rolled forwardly into a carrier mechanism and the tube is carried upwardly and forwardly in an arcuate path until the top thereof contacts belt 76, as shown at "c."

When the top of the tube contacts the lower surface of belt 76, the belt begins to rotate the tube. The tube may freely rotate since it is now supported by two rollers 62 which are journalled in the tube carrier mechanism. As the tube continues to move upwardly in its arcuate path, it presses more firmly against belt 76, and the rotating action of the belts becomes more positive. Slack for the deflection of the belt is provided by the yielding action of roller 84 which is resiliently urged in an upward path by spring 108 on the end of arm 94, as described above.

As the rotating tube (which is now in the position shown at "c" in FIG. 4) approaches the top of its arcuate path, it comes into contact with rapidly rotating saws 112. As the rotating tube is brought gradually into contact with saws 112, the saws cut the same into predetermined lengths. Because of the relative rotation of saws 112 and the tubes in the carrier, the tubes are cut cleanly and squarely into predetermined lengths.

After the tubes have been cut, the continued rotation of the tube carrier brings the tube into the position shown at "d" in FIG. 4. When the cut tubes reach this position, they roll out of the tube carrier and down into a discharge chute 197 and are discharged from the machine as shown at "e."

While the action which has just been described is occurring, another tube in chute 20 rolls forwardly and is picked up by the tube carrier, as described above. In like manner, each tube is picked up in turn, and carried upwardly in an arcuate path into contact with saws 112 and is cut into predetermined lengths. In this manner, the machine will operate continuously as long as chute 20 is kept filled with a supply of uncut paper tubes.

The machine embodying this invention is adapted to handle paper tube of a wide range of sizes into pieces of any length. The adjustments which have been described above are provided in order to adapt the machine for the job to be done. The first step in setting up the machine for a particular job is to remove saw shaft 114 and to mount the requisite number of saw blades thereon. Shaft 114 is then returned to its position in the machine.

The next step in setting up the machine is the adjustment of the tube carrier to accommodate the particular diameter of the tubes to be cut. This is done by releasing the bolts which clamp plates 54 to gears 56 and rotating plates 54 relative to gears 56 until rollers 62 are positioned at the proper relative distance from each other to properly support the tube to be cut. For example, where a large diameter tube is to be cut, rollers 62 are moved outwardly so as to provide large spaces therebetween in order to support the large diameter tube. Smaller tubing is accommodated by moving rollers 62 inwardly in order to attain a smaller spacing therebetween. When the proper spacing of rollers 62 has been accomplished to support the diameter of the tube to be cut, plates 54 and gears 56 are clamped in relative adjusted position, and the tube carrier is now ready to support the tubing to be cut.

After the tubing carrier has been adjusted, as described above, the entire carrier mechanism must be adjusted vertically so that the tubing supported by the carrier will properly contact saws 112. This is done by a manipulation of handle 72 which rotates shaft 70 which rotates worms 68 to rotate worm wheels 66 which in turn rotate vertical shafts 64 to move the entire tube carrier and its driving motor vertically, as described above. When this has been done, the speed of the tube carrier is adjusted by manipulation of screw 192 which varies the effective diameter of variable pulley 180.

When this speed adjustment has been made, the speed of belts 176 is adjusted to rotate the tubing in the carrier at the correct peripheral speed. This is done by manipulation of screw 162, varying the effective diameter of variable pulley 156, as described above.

The position of chute 20 must then be adjusted so as to feed tubing to the tubing carrier properly. Where large diameter tubing is being cut, chute 20 is moved downwardly and away from the tubing carrier so that there is sufficient clearance between the lip on the end of bottom 22 of chute 20 and rollers 62 to allow each tube to roll freely into the tubing carrier. Where smaller diameter tubing is being cut, chute 20 is adjusted upwardly and forwardly so that only sufficient clearance is allowed to permit one tube at a time to roll into the tubing carrier.

When these adjustments have been made, the machine is ready for the particular job at hand. The operator need then only start the various driving motors and then feed a continuous supply of tubing to chute 20. When this is done, the machine will operate automatically in order to cut the tubing into the predetermined lengths as long as chute 20 is kept full of uncut tubes.

It thus may be seen that the machine embodying this invention attains its stated objects. The machine may be adjusted to cut tubing of any diameter within its capacity into any number of predetermined lengths. Once set up, it is completely automatic, and only requires a continuous supply of tubing. This may either be done manually or by means of an automatic conveyor system of a suitable type.

While there has been shown and described the preferred forms of mechanisms of the invention, it will be

I claim:

1. A machine for cutting tubes into predetermined lengths, said machine comprising, in combination, tube cutting means, tube carrier means including a shaft, a pair of spaced disc-like members on said shaft, a plurality of roller members rotatably mounted between said disc-like members, parallel to and spaced from said shaft, whereby said carrier means is adapted to rotatably support a tube between pairs of adjacent roller members and to move the same in an arcuate path into contact with said cutting means.

2. A machine for cutting tubes as claimed in claim 1 wherein said tube supporting roller members are adjustably mounted on said disc-like members for radial adjustment to accommodate tubes of various diameters.

3. A machine for cutting tubes as claimed in claim 1 wherein said tube carrier is movably mounted for adjustment in a direction toward or away from said cutting means in order to accommodate tubes of various diameters.

4. A machine for cutting tubes as claimed in claim 1 having moving belt means adjacent to said cutting means for engaging said rotatably supported tubes to cause the same to rotate about their own axes while being cut.

5. A machine for cutting tubes as claimed in claim 1 wherein each of said disc-like members comprises a pair of relatively rotatably superimposed discs, one of said superimposed discs having a plurality of radial slots, the other of said discs having a plurality of substantially spirally arranged slots, said roller members having trunnion means engaging the edges of said slots and supported thereby, said discs being relatively rotatable to adjust the radial distance of said rollers from the center of said carrier to accommodate tubes of various diameters.

6. A machine for cutting tubes into predetermined lengths, said machine comprising, in combination, tube cutting means, tube feeding means, tube carrier means adjacent to said feeding means for receiving said tubes, one at a time, and moving the same in a substantially arcuate path into contact with said cutting means, endless belt means moving in a plane perpendicular to the axis of said tubes supported in said carrier, means for yieldingly tensioning said belt means, at least one portion of said belt being disposed in the path of said tube as it approaches and contacts said cutting means, whereby said tube is pressed against said yieldingly mounted belt for causing said tube to rotate about its own axis while it is being cut.

7. A machine for cutting tubes into predetermined lengths, said machine comprising, in combination, tube cutting means, an inclined chute for holding a plurality of tubes, rotating tube carrier means adjacent to the end of said chute, said carrier means comprising a central shaft, a plurality of substantially parallel circumferentially spaced roller elements rotatably mounted around said shaft, the axes of said roller elements lying in a circle concentric with the axis of said shaft, the spaces between said roller elements being sufficient to receive only one tube, whereby said carrier means receives said tubes from said chute, one at a time, and carries them into engagement with said cutting means.

8. A machine as claimed in claim 7 wherein said roller elements are radially adjustable to vary the spaces between adjacent roller elements and said inclined chute is adjustably mounted to vary the distance between the lower end of said chute and said roller elements for adjusting said machine to receive tubes of various diameters.

9. A machine as claimed in claim 7 including moving belt means disposed in the path of said tubes as they approach said cutting means for causing said tubes to rotate about their own axes as they are cut.

References Cited in the file of this patent

UNITED STATES PATENTS

| | | |
|---|---|---|
| 1,040,587 | Stork | Oct. 8, 1912 |
| 1,095,076 | Brethour | Apr. 28, 1914 |
| 2,298,366 | Gladfelter et al. | Oct. 13, 1942 |
| 2,321,735 | Clifford | June 15, 1943 |
| 2,771,662 | Ziska | Nov. 27, 1956 |